US010095590B2

(12) United States Patent
Bissett et al.

(10) Patent No.: US 10,095,590 B2
(45) Date of Patent: Oct. 9, 2018

(54) CONTROLLING THE OPERATING STATE OF A FAULT-TOLERANT COMPUTER SYSTEM

(71) Applicants: Thomas D Bissett, Shirley, MA (US); Stephen J Wark, Shrewsbury, MA (US); Paul A Leveille, Grafton, MA (US); James D McCollum, Princeton, MA (US); Angel L Pagan, Holden, MA (US)

(72) Inventors: Thomas D Bissett, Shirley, MA (US); Stephen J Wark, Shrewsbury, MA (US); Paul A Leveille, Grafton, MA (US); James D McCollum, Princeton, MA (US); Angel L Pagan, Holden, MA (US)

(73) Assignee: Stratus Technologies, Inc

( * ) Notice: Subject to any disclaimer, the term of this patent is extended or adjusted under 35 U.S.C. 154(b) by 217 days.

(21) Appl. No.: 15/147,083

(22) Filed: May 5, 2016

(65) Prior Publication Data
US 2016/0328302 A1 Nov. 10, 2016

Related U.S. Application Data

(60) Provisional application No. 62/157,826, filed on May 6, 2015.

(51) Int. Cl.
*G06F 11/14* (2006.01)
*G06F 9/455* (2018.01)
(Continued)

(52) U.S. Cl.
CPC ...... *G06F 11/1484* (2013.01); *G06F 9/45558* (2013.01); *G06F 11/301* (2013.01);
(Continued)

(58) Field of Classification Search
CPC .. G06F 11/1484; G06F 11/301; G06F 11/302; G06F 11/3051; G06F 11/3495; G06F 9/45558; G06F 2009/45591
See application file for complete search history.

(56) References Cited

U.S. PATENT DOCUMENTS

9,208,015 B2 * 12/2015 Vavrick ............... G06F 11/0793
9,329,947 B2 * 5/2016 Elyashev ............ G06F 11/1484
(Continued)

*Primary Examiner* — Paul Contino
(74) *Attorney, Agent, or Firm* — Robert Schuler (57) ABSTRACT

A fault tolerant computer system having two virtual machines (VMs), each running on a separate host device, is connected over a network to one or more I/O devices. The system operates to monitor the health of one or more operational characteristics associated with each VM, and in the event that the health of both virtual machines dictates that one or the other of the VMs should be downgraded, but the system is not able to determine which VM should be downgraded and there is an imbalance in a monitored system operational characteristic, the system can defer downgrading one VM for a selected period of time during which the operational characteristic that is in imbalance is monitored. If the imbalance is resolved, the downgrade is cancelled, if an operational fault is confirmed prior to the expiration of the deferral period or if the deferral period expires, then one host is downgraded.

10 Claims, 5 Drawing Sheets

(51) Int. Cl.
*G06F 11/30* (2006.01)
*G06F 11/34* (2006.01)

(52) U.S. Cl.
CPC ........ *G06F 11/302* (2013.01); *G06F 11/3051* (2013.01); *G06F 11/3495* (2013.01); *G06F 2009/45591* (2013.01); *G06F 2201/815* (2013.01)

(56) References Cited

U.S. PATENT DOCUMENTS

| | | | |
|---|---|---|---|
| 2008/0307259 A1* | 12/2008 | Vasudevan | G06F 11/0712 714/23 |
| 2011/0029970 A1* | 2/2011 | Arasaratnam | G06F 9/45558 718/1 |
| 2011/0314470 A1* | 12/2011 | Elyashev | G06F 11/1484 718/1 |
| 2012/0284628 A1* | 11/2012 | Wong | H04L 67/306 715/736 |
| 2013/0055261 A1* | 2/2013 | Han | G06F 9/45558 718/1 |
| 2013/0227335 A1* | 8/2013 | Dake | G06F 11/0709 714/4.2 |
| 2013/0275805 A1* | 10/2013 | Harper | G06F 11/1438 714/16 |
| 2013/0283086 A1* | 10/2013 | Bradley | G06F 11/0793 714/2 |
| 2015/0154046 A1* | 6/2015 | Farkas | G06F 9/485 718/1 |
| 2016/0147550 A1* | 5/2016 | McWilliams | G06F 21/121 718/1 |

\* cited by examiner

FIG. 1A  FAULT TOLERANT SYSTEM 100

CONTROLLING THE OPERATING STATE OF A FAULT-TOLERANT COMPUTER SYSTEM

1. FIELD OF THE INVENTION

The present disclosure relates to fault tolerant computing system, and to controlling an operational state of a virtual machine running in the fault tolerant computing system according to a health of the virtual machine.

2. BACKGROUND

Figure 1A:
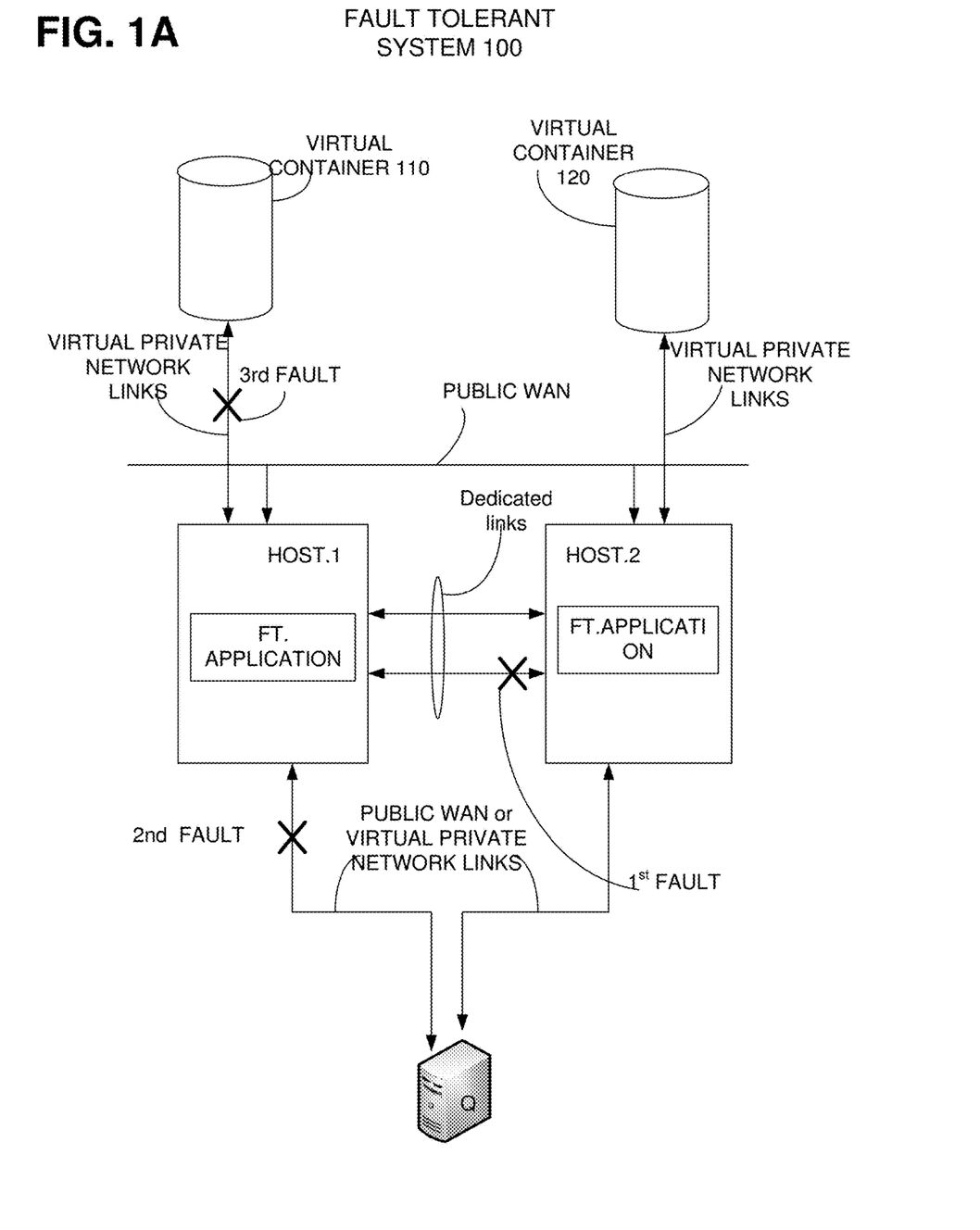
FIG. 1A is a diagram showing the functional components comprising a fault tolerant computer system 100 and their connectivity to each other.

FIG. 1A shows a number of elements comprising a fault tolerant computer system 100. This system 100 has two host computational devices (i.e., servers), Host.1 and Host.2, each of which can support one or more pairs of virtual machines (not shown), each pair of which is configured to perform the same set of operations (Application) at substantially the same time, and both of which are configured to operate together such that no single point of error (Communication Link Fault for instance) in the system can result in one or the other of the virtual machines becoming unavailable to run the application. Applications running in systems such as system 100 are typically referred to as fault tolerant applications. Each of the host computers Host.1 and Host.2 are connected over a plurality of dedicated network links or paths to each other, each of the host computers are connected over virtual network paths or links to two different logical storage containers, I/O and 120 respectively, and both of the host computers are in communication over the virtual private network (VPN) or public network links with a Quorum computer Q.

During normal fault tolerant operation of the system 100, a pair of virtual machines (VMs) running on Host.1 and Host.2 can both operate in an active, on-line mode or state, with one VM operating as an active master and the other device operating as an active slave. In the event it is determined that the state of the operational health of one or the other of the VMs is poor, and so one of the VMs is no longer able to operate in a fault-tolerant mode (active mode), or is at risk of not being able operate in a fault tolerant mode, the operational state of the VM that is identified to be in poor health (faulty) can be downgraded to be either offline or online, and although the application running on the host devices is still available to a user, it is no longer fault tolerant. Functionality running in association with each of the virtual machines can monitor and quantify the health of a plurality of substantially immediately detectable operating characteristics associated with each VM. From one perspective, and in the context of a fault tolerant computer system, an immediately detectable operating characteristic can be characterised as one that is detected in less than the time it takes to detect that communication is lost between a pair of virtual machines, or less than the time it take to detect that the virtual machine has lost communication with functionality (internal or external to the computer system) that the fault tolerant computer system relies upon to provide fault tolerant services. This functionality can monitor the health of one or more virtual machines running on each host, it can monitor the health of the network to which each VM is connected, and it can monitor connectivity between each VM and a Quorum server, and it can monitor the health of operational characteristics associated with I/O devices (physical or virtual containers) connected to the network with which the VMs communicate and that are considered to be essential to the fault tolerant operation of the system 100.

All of these operational characteristics can be considered individually or as a whole in order to determine the state of the health of each virtual machine running on both of the host devices, and depending upon the state of the health (normal or poor health) of each virtual machine, a decision can be made to downgrade the operational state of any one or more of the virtual machines.

4. DETAILED DESCRIPTION

As described earlier, certain types of virtual machine operational characteristics are easily monitored and can be quickly detected, and typically the operational state of the virtual machine that is not able to continue to run an FT application, or is at risk of not being able to continue to run an FT application, is downgraded. As described earlier, an immediately detectable operating characteristic can be characterised as one that is detected in less than the time it takes to detect that communication is lost between a pair of virtual machines, or less than the time it takes (threshold time) to detect that the virtual machine has lost communication with functionality (internal or external to the computer system) that the fault tolerant computer system relies upon to provide fault tolerant services. Each type of immediately detectible operating characteristic threshold time is configurable in the virtual machine. Generally, one operational characteristic that can be easily monitored and quickly detected is the number of network communication paths between a pair of virtual machines, each VM running on a different host device, and another immediately detectable operational characteristic is connectivity between each VM and the Quorum server. Each virtual machine running on a host device is configured to run in an active, on-line state as long as it has two or more operational network paths between it and another virtual machine running the same FT application. During normal operation, the host devices can send signals to each other over all network paths available to it. Responses to these signals can be used to determine how many network paths exist between a VM running on one host and a VM running on another host. If, for any reason, the number of paths available to a VM drops below a selected threshold value, which in one embodiment is two paths, then the operation health state of this VM is considered to be poor (no longer able to run in a fault tolerant mode), and operational state of this VM is immediately downgraded. In this regard, FIG. 1A shows a 1st fault in a dedicated network communication path, between the FT application running on Host.1 and the FT application running on Host.2, that drops the number of operational links between the FT application to one. In this case, the virtual machine detecting this condition first will determine that it is in poor health and its operational state will be downgraded. It should be understood that for illustrative purposes, the plurality of dedicated links between Host.1 and Host.2 are shown as two links. In order for either host to decide to downgrade its operational state (or the operational state of a virtual machine running on either host), the number of operational links has to drop below two. So, for the purpose of illustrating a fault condition that causes such a downgrade in the operational state of a VM, FIG. 1A shows the first fault disabling one of the two dedicated links that remain operational at a point in time, which has the effect of dropping the number of operational, dedicated links below two, which in this case is an indication that the VM is in poor health. Also, while FIG. 1A shows only two host devices operating in the system 100, more than two host devices (each running a VM) can cooperatively operate to run a FT application.

Another type of operational characteristic that is immediately detectable (easily monitored and quickly or immediately detected) is connectivity between a virtual machine and a Quorum server assigned to it. In this regard, FIG. 1A shows a second fault in a network communication path between the Quorum server and the VM running the FT application on Host.1. When the VM on Host.1 detects that it is no longer in communication with the Quorum server (i.e., it is in poor health) its operational state is immediately downgraded, and the application is no longer operating in a fault tolerant mode.

Figure 1B:
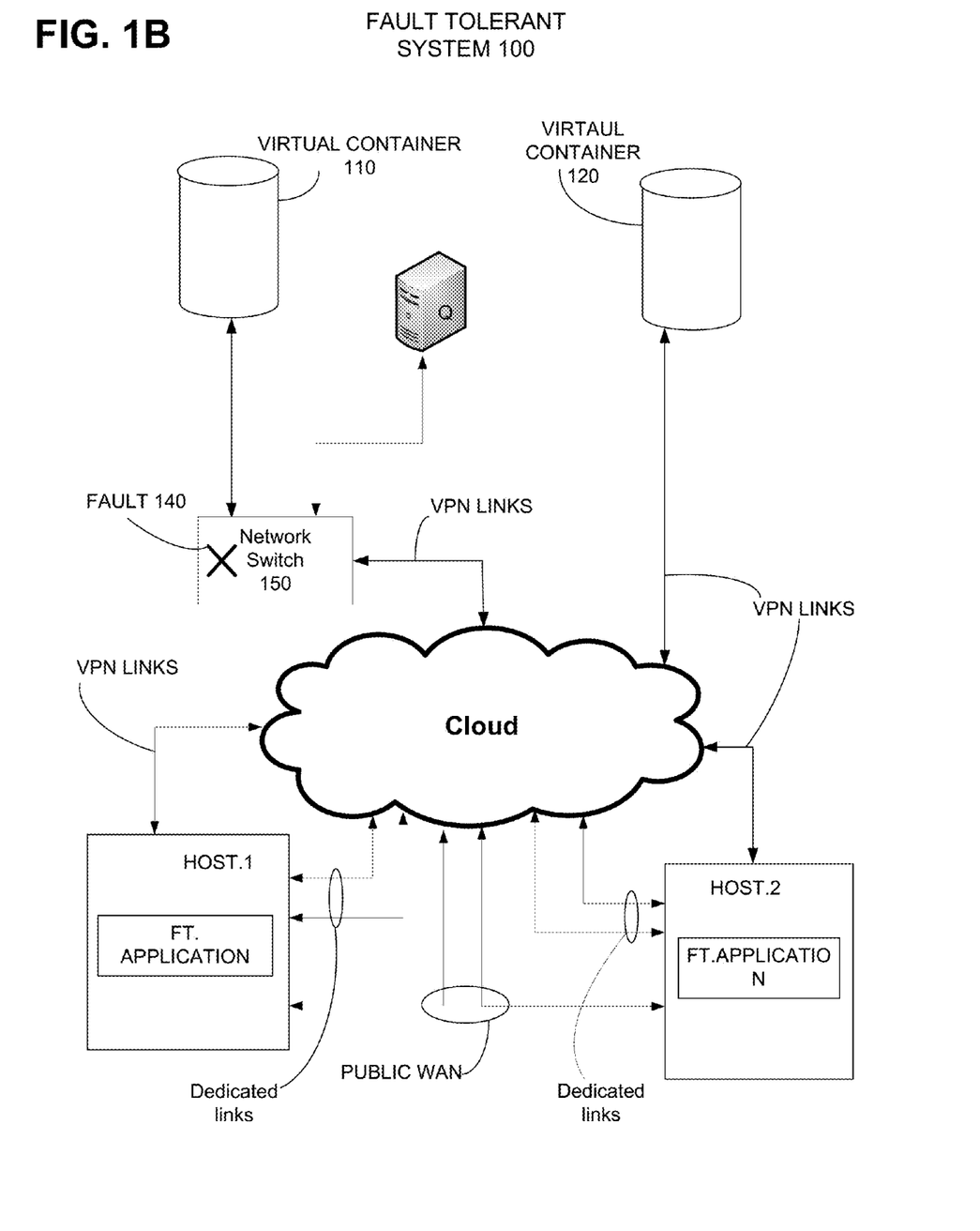
FIG. 1B is a diagram showing the computer system 100 of FIG. 1A in a network cloud implementation.

FIG. 1B is a diagram showing another embodiment of the fault tolerant computer system 100 implemented in a network cloud environment. This embodiment shows Host.1 and Host.2 (or a VM running on each host) in communication over one or more VPN links with the virtual container allocated to them, which in this case is the virtual container I/O and the virtual container 120 respectively. Each host, or VM running on each host, is also in communication over one or more VPN links with the quorum server Q, and a network switch 150 is shown in the communication path between the quorum server Q and both host devices. According to this arrangement, in the event that the switch 150 experiences a fault 140 that effectively renders the network links between it and the Cloud inoperative, both Host.1 and Host.2 (or VMs running on each host) will lose connectivity with the quorum server, in which case the operational health state of both VMs is equally poor and the operational state of either one of the VMs may be downgraded (whichever VM first detects the loss of connectivity with the Q). However, in the fault 140 scenario, the VM running on Host.1 will also lose connectivity with the virtual container I/O allocated to it, but the VM may not detect this loss of connectivity (poor health) for several minutes. The detection of this type of fault is referred to herein as delayed detection operational characteristic, and this type of operational characteristic can be characterised as one that is detected in more than the time (threshold time) it takes to detect that communication is lost between a pair of virtual machines, or more than the time it takes to detect that the virtual machine has lost communication with functionality (internal or external to the computer system) that the fault tolerant computer system relies upon to provide fault tolerant services. Each type of delayed detection operational characteristic threshold time is configurable in a virtual machine. Under these circumstances, the poor health of the VM on Host.1 indicates that the operational state of the VM on Host.1 should correctly be downgraded, as it has lost its connection to the both Q server and to the virtual container (while the VM running on Host.2 has only lost connectivity with the Q), but since the VM on Host.1 typically will not detect the loss of connectivity (poor health) with the virtual container for several minutes (delayed detection), the system 100 is not able to quickly determine which VM should be downgraded.

As described earlier, it may not be possible to accurately or correctly identify which of the two virtual machines should be downgraded if the overall health of the pair of virtual machines (as determined by network connectivity and Quorum server connectivity) running the same FT application appears to be equally poor. Accordingly, even though one of the virtual machines may not be able to continue to run the FT application, it may not be possible to easily and/or readily determine which one of the virtual machines running the same FT application should be downgraded. In this event, it may be possible to identify the correct virtual machine to downgrade by examining a virtual machine operational characteristic other than an immediately detectable type of operational characteristic.

One type of VM operational characteristic that is not immediately detectable (delayed detection operational characteristic), but which can be monitored and employed to determine the state of health of a virtual machine, is the operational health of an I/O device connected or assigned to a virtual machine. Some I/O requests issued by a virtual machine can take several minutes to complete, if ever. In this regard, an outstanding read/write request, issued by a virtual machine to a virtual container allocated to it, may never successfully complete if there is a fault, such as a third fault shown in FIG. 1A, in a communication path between the host and the container. The virtual machine may not realize for several minutes (after an I/O timeout period) that it will not receive confirmation that a write request was completed or not. Regardless, it is important to correctly identify which virtual machine is no longer able to support a FT application, and then downgrade the operational state of this virtual machine as quickly as possible.

One method which can be employed to detect the relative health of two virtual machines running the same FT application is to monitor the number of outstanding I/O requests issued by each virtual machine. If there is an imbalance in the number of outstanding I/O requests, or there is an imbalance in the number of confirmations received for outstanding I/O requests, then a VM running on one host can be indicted as the VM that is not operating properly (in poor health), and it's operational state can be immediately downgraded (VM running on Host.1 in this case). However, since the period of time it takes to receive confirmation that an I/O request is complete can vary from VM to VM, and because this confirmation can take up to several minutes, it is possible that the wrong VM (or Host) may be indicted for faulty operation and needlessly taken offline.

So, in the event it is determined that the poor health of two virtual machines running the same FT application on different host devices requires that the operational state of one or the other of the virtual machines be downgraded, but because the quantified operational health state of each virtual machine is indistinguishably poor, and consequently it is not possible for a fault tolerant system to accurately determine which of the two virtual machine should be downgraded, it was discovered that an imbalance in a delayed detection operational characteristic (i.e., outstanding I/O requests) between each virtual machine can be employed to defer an otherwise immediate downgrade of either of the two virtual machines. By deferring the downgrade of the operational state of either virtual machine, it is possible to improve the probability that the operational state of the correct virtual machine is downgraded. The decision to downgrade either virtual machine is deferred for some pre-selected, maximum period of time, and during the time that the downgrade is deferred the imbalance in the outstanding I/O requests continues to be monitored. (1) If the imbalance in the I/O requests between the two virtual machines resolves during the deferral period (I/O request confirmation is received), then neither virtual machine is downgraded, (2) if an I/O request for the virtual machine causing the imbalance times out during this period, then the operational state of this virtual machine is downgraded, and (3) if the deferral time period expires before either virtual machine receives a confirmation or a time out message, then the operational state of the virtual machine on the host causing the imbalance is downgraded.

Figure 2:
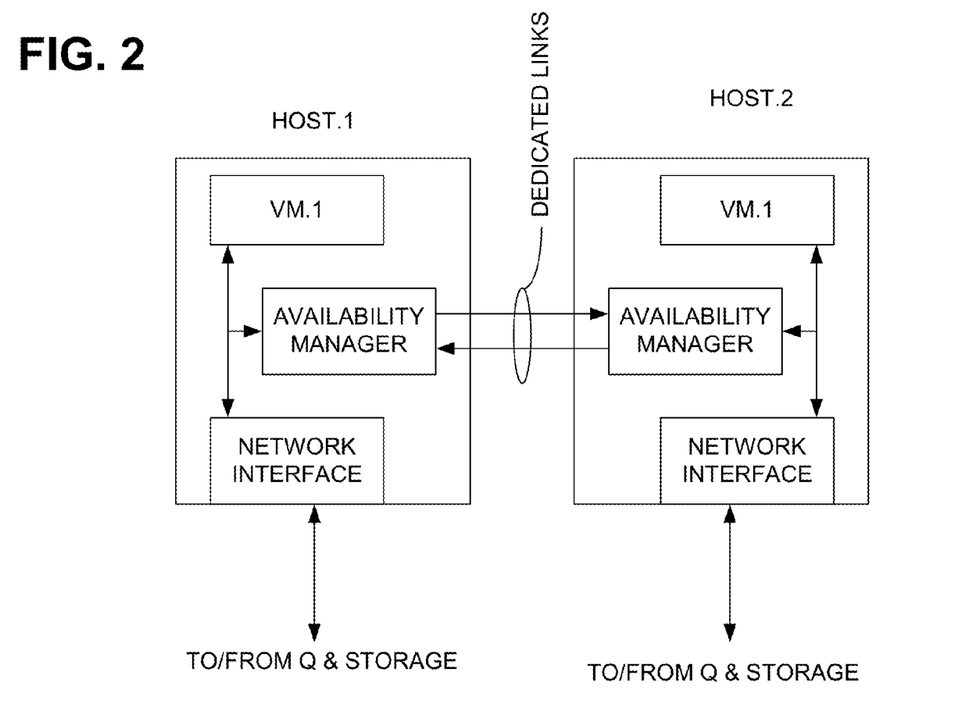
FIG. 2 is a diagram showing two host devices comprising the system 100 of FIG. 1A.

FIG. 2 is a diagram showing functional blocks comprising the two host devices, Host.1 and Host.2 operating in the fault tolerant system 100 described earlier with reference to FIG. 1A. Each host device can have a separate availability manager that is responsible for monitoring the health of each of one or more virtual machines. In this case, only one virtual machine, VM.1, is illustrated in FIG. 2, and the VM running on each host can support one or more FT applications. Each virtual machine running on a host device has an appropriate network interface to support the transmission and reception of signals and other information to and from a WAN. Also shown in FIG. 2 are one or more network links that are dedicated to transmitting messages generated by an inter-host communication protocol running on each availability manager. The availability manager runs in the background on each host device to continually monitor the health of a plurality of operational characteristics (both immediate and delayed characteristics) relating to each virtual machine that are essential to the fault tolerant operation of the system 100. During normal, fault-tolerant operation, the virtual machines (VM.1) running in each host, Host.1 and Host.2) are performing the same set of operations at substantially the same time, and in the event that the operational state of one virtual machine is downgraded, the application running on the other virtual machine continues to be available to users without interruption.

Continuing to refer to FIG. 2, each virtual machine uses the dedicated link(s) to, among other things, communicate information relating to the operational characteristics to the other virtual machine (i.e., HB, network health and I/O health). The heart beat message or signal is generated and sent periodically by each one of a pair of virtual machines to the other virtual machine (The availability manager on each host is in periodic communication with both the quorum server and with each other. The messages being sent contain VM health information, serving both a HB and a health role), and the HB signal carries no specific information but is merely is an indication to the other virtual machine that the sending virtual machine is still operating in the active mode. If at least one consecutive HB signal is not received at the expected time, then the availability manager running in association with one virtual machine can determine that the health of the other virtual machine is such that (poor health) the operational state of the other virtual machine has been downgraded. The operational characteristic associated with the network health can be an indication of the number of network links (dedicated or not) that currently exist between a virtual machine running on one host device and a virtual machine running on another host device. In one embodiment, the minimum number of network links that can be operational is two (but this number is selectable), and if a VM detects that fewer than two links are operational, then the operational state of that virtual machine is downgraded. An availability manager associated with each virtual machine maintains a quantitative record of each operational health characteristic that is monitored with respect to that virtual machine, and it periodically sends information relating to this quantitative record to the other host. In the event it is detected that network connectivity to either of the virtual machines drops below two, or if connectivity to a quorum servers is lost, then the virtual machine detecting this condition first can notify the other virtual machine that it is being downgraded.

Figure 3:
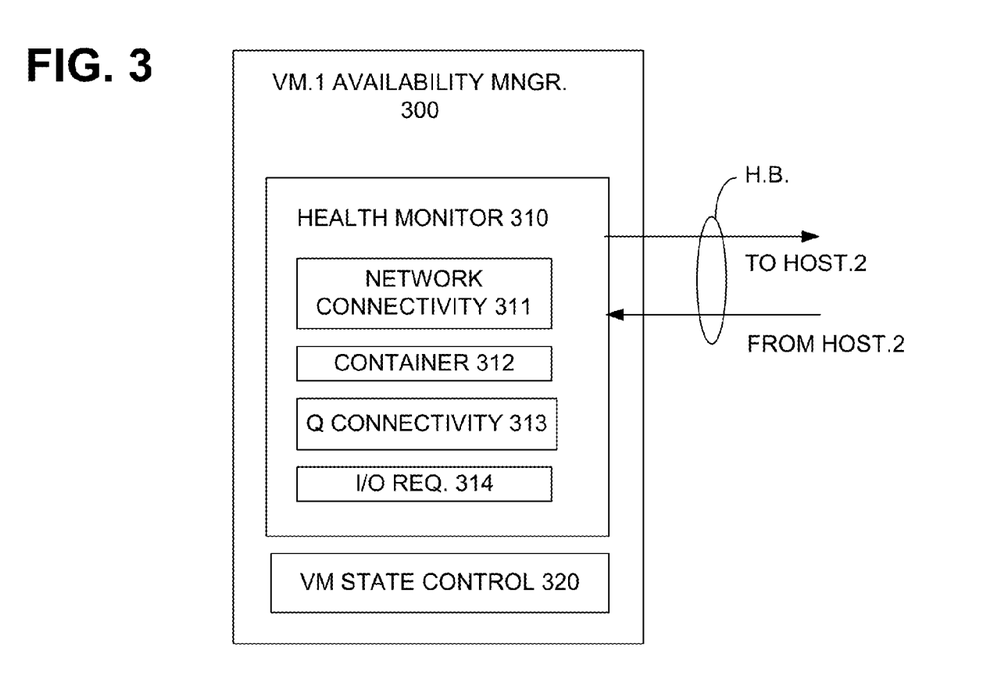
FIG. 3 is a diagram showing functionality comprising an availability manager.

FIG. 3 is a diagram showing functional blocks comprising an availability manager 300 operating on VM.1 running on Host.1. The VM.1 availability manager has a health monitor function 310 and a VM state control module 320 that operates to control the operational state of the VM.1. The health monitor function runs a number of routines that detect certain operational characteristics (both immediately detectable and delayed detection characteristics) associated with the VM.1. It runs a routine 311 that detects the operational status of each network link that is identified to be common between the VM.1 running on Host.1 and the VM.1 running on Host.2 and it maintains a current record of the link count, it runs a routine 312 that monitors the health of a virtual container associated with each VM (i.e., whether the container is on-line and accessible or not), it runs a routine 313 that monitors connectivity to a quantum server and connectivity to the other host, Host.2 in this case, and it runs a routine 314 that monitors outstanding I/O requests generated by each VM. The outstanding I/O request routine 314 examines the operating system (typically, the operating system running on a host device manages the sending of I/O requests and the reception of I/O confirmation messages) for the times that an I/O request is issued, the time that a I/O request completion confirmation is received, and for the identity of the network links over which the requests are transmitted.

The virtual machine state control 320 is comprised of logical computer instructions that generally use the operational characteristics maintained by the health monitor to determine in which operational state the VM.1 should be running. Generally, this logic operates to downgrade the state of a VM if it determines that network connectivity to the VM drops below an acceptable level or its connectivity to a quorum server is lost. However, if the health of each VM is equally poor (i.e., both VMs loose connectivity to a quorum server), the logic may not be able to correctly determine which VM running on the hosts, Host.1 or Host.2, should be downgraded. If this is the case, and according to one embodiment, the logic can examine the number of outstanding I/O requests for the VM.1 running on Host.1 and the VM.1 running on Host.2. If the logic determines that there is an imbalance between outstanding requests, then it can defer the normal operation of the availability manager to downgrade the host by overriding a downgrade operation for up to a pre-selected period of time. As described earlier, this period of time can be arrived at using empirical evidence, and in one embodiment this deferral period is thirty seconds. If the outstanding I/O request(s) is/are still not balanced after the thirty second deferral period, than the logic can permit the availability manager to immediately downgrade the operational state of either virtual machine to be online or offline. A more detailed discussion of the host state logic is undertaken later with reference to FIG. 6.

Figure 4:
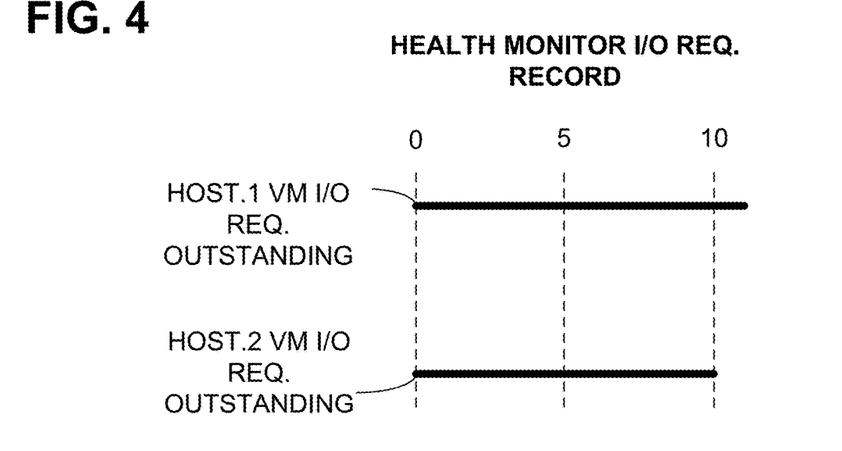
FIG. 4 is a diagram showing a comparison of outstanding I/O requests between a Host.1 VM and Host.2 VM.

FIG. 4 is a diagram that illustrates the number of I/O requests issued by the VM.1 on Host.1 and the VM.1 on Host.2 that are currently outstanding (i.e., confirmations have not been received for the number of recorded I/O requests). In this case, the Host.1 VM has issued eleven outstanding requests for either a read from or a write to a virtual container, or some other storage device, and the Host.2 VM has ten outstanding I/O requests for an imbalance of one I/O request. While an I/O request completion imbalance is described as being used by the host state control logic, other delayed detection operational characteristics can be used. As described earlier, detection of this operational characteristic imbalance does not precipitate a deferral of a downgrade to a VM unless the system 100 is unable to determine which VM to downgrade due to equally poor health of each VM.

Figure 5:
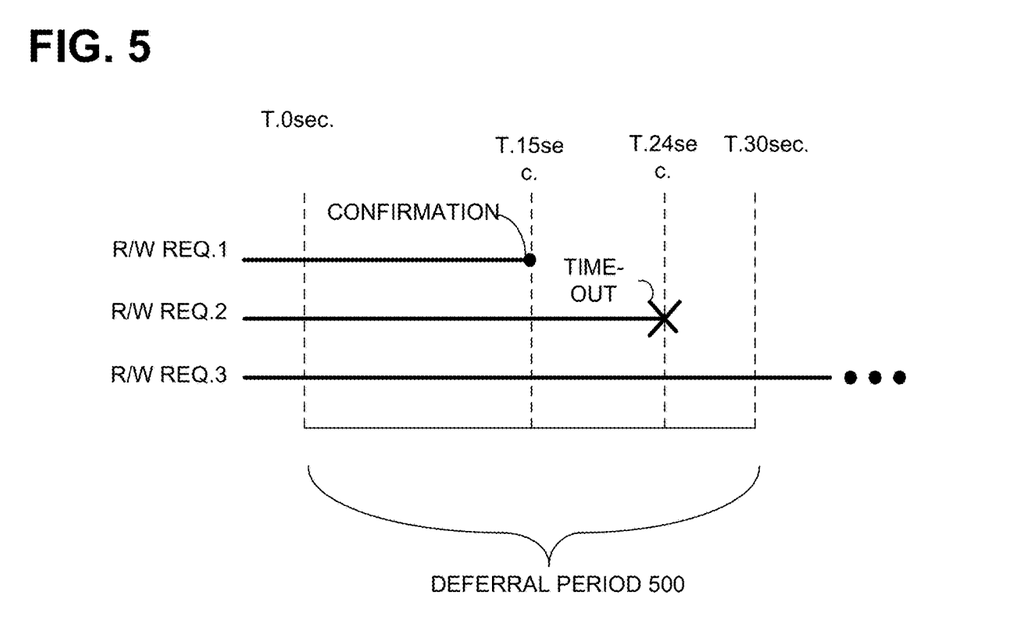
FIG. 5 is a diagram illustrating events that can occur during a downgrade deferral time period.

FIG. 5 illustrates a deferral period 500 time line starting at time T.0, running for thirty seconds, and ending at time T.30. The effect that three separate I/O requests can have on the VM state control module 320 logic during a deferral period will now be considered with reference to FIG. 5. Taken separately, each one of the I/O requests, R/W Req.1, R/W Req.2 and R/W Req.3, issued by the VM.1 running on Host.1 can be the proximate cause for the imbalance illustrated in FIG. 4. For the purpose of this discussion, each request is issued by VM.1 at some point in time prior to the time T.0 in FIG. 4, and for the purpose of this description it is assumed that at T.0, the imbalance in outstanding I/O requests is currently as shown in FIG. 4, which shows that there is an imbalance of one outstanding request. In operation, and subsequent to the system 100 detecting that VM.1 on Host.1 and VM.1 on Host.2 have equally poor health, the logic comprising VM state control 320 at T.0 detects an outstanding I/O request imbalance of one between the VMs running on Host.1 and Host.2. Detection of this imbalance can result in the logic overriding the normal operation of the Host.1 VM.1 availability manager to immediately downgrade the VM, and defer a downgrade operation for up to thirty seconds, during which time the logic monitors the imbalance in the outstanding I/O requests between the VMs of each host. According to one case, at time T.15, the health monitor detects that R/W Req.1 is confirmed, and so the imbalance drops from one to zero, and the pending downgrade is cancelled. According to another case, at time T.24 the health monitor detects that the operating system has signaled that the R/W Req.2 has timed out, and at this time the logic controls the operational state of VM.1 running on Host.1 to transition to be either online or offline. According to another case, at time T.30 the health monitor detects that the R/W Req.3 remains outstanding, and the logic can control the operational state of the VM.1 running on Host 1 to transition to be either online or offline. The logic employed to control the deferral period is now described in more detail with reference to the diagram in FIG. 6.

Figure 6:
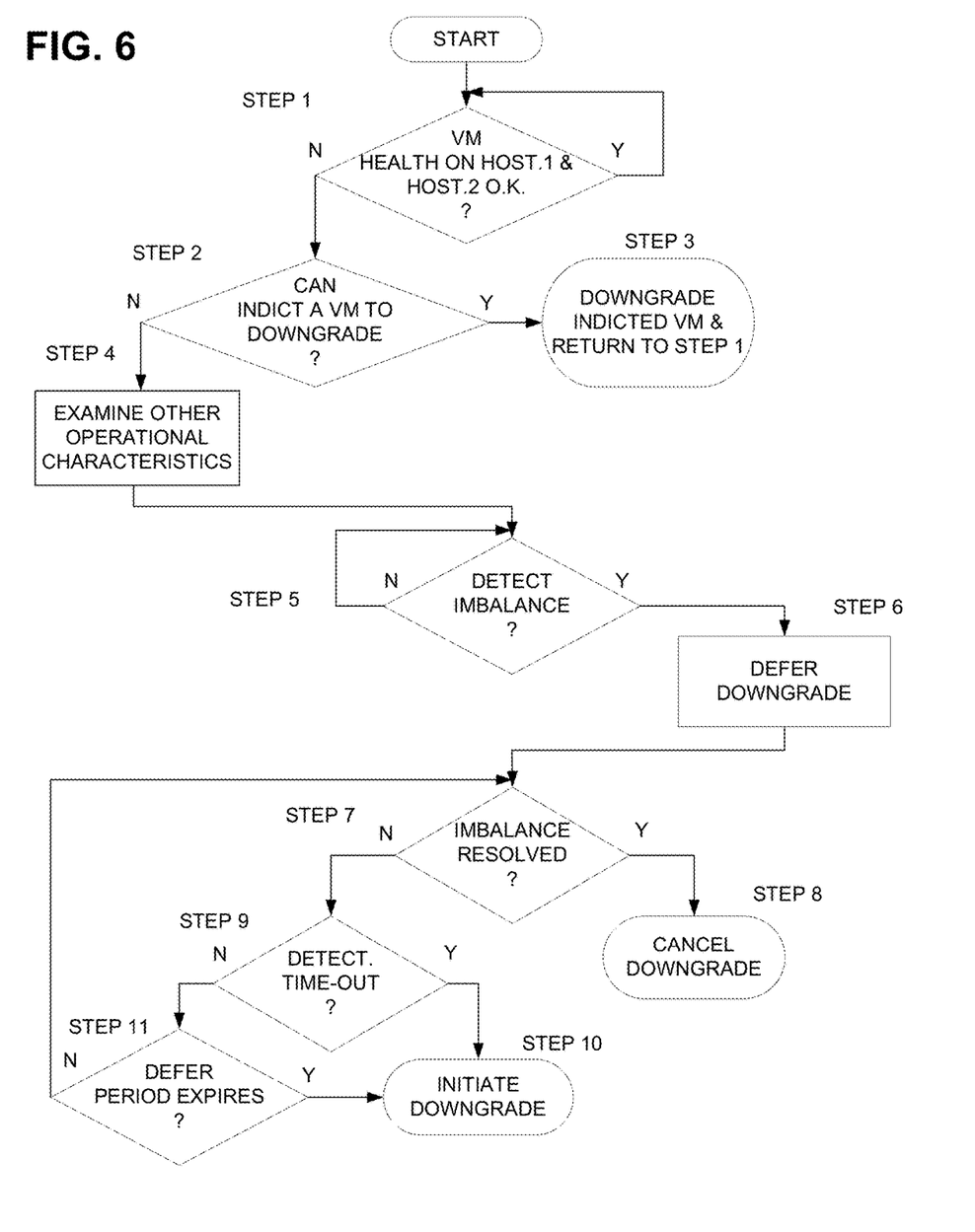
FIG. 6 is a flow diagram showing logic that controls the downgrade operation.

FIG. 6 illustrates a logical process (implemented by the logic comprising the VM state control 320) running on each availability manager associated with each VM. This logic operates to detect the health of VM pairs running a FT application on two different host devices, and depending upon the health of each VM, the logic operates to control the VM state to be active and online, inactive or offline. In the event an examination of one or more immediately detectable operational characteristics indicates that the health of both VMs is indistinguishably poor, and the logic is not able to determine which VM should be downgraded, then a delayed operational characteristic common to both VMs is examined for an imbalance, and if an imbalance is detected the process can defer downgrading the system until the imbalance resolves, or until a pre-selected deferral period expires. While the embodiment described herein refers to an imbalance in outstanding virtual machine I/O requests, it should be understood that other fault-tolerant system delayed operational characteristics can be monitored that affect this logical process to control the operating state of a virtual machine running on a host comprising the system 100.

Referring now to FIG. 6, at a point in time that the system 100 is operating in a fully fault-tolerant mode (both VM.1 running on Host.1 and VM.1 running on Host.2 are active and online), in Step 1 the logical process periodically examines immediately detectible operational characteristics of each virtual machine VM.1 running on Host.1 and Host.2, and if an examination of the these characteristics indicates that the health of each VM is acceptable, then the process loops one Step 1. On the other hand, if in Step 1 it is determined that the health of one VM is not acceptable, then the process proceeds to Step 2 and the logic compares the health of each VM. If the logic is able to determine that the health of one or the other of the VMs is not acceptable, then in Step 3 the operational state of the VM exhibiting unacceptable health is downgraded and the process returns to Step 1. However, if in Step 2 the logic is unable to determine that the operational state of one or the other of the VMs should be downgraded, then the process proceeds to Step 4. In Step 4 the VM state logic examines the value of certain VM delayed operational characteristics not examined in Step 1, this can include common characteristics associated with both VM.1 running on Host.1 and VM.1 running on Host.2. According to an embodiment described here, an operational characteristic being monitored is the number of outstanding I/O requests issued by both VM.1 on Host.1 and VM.1 on Host.2. The VM state control logic continually monitors this characteristic during the time that either or both virtual machines are in an online operational state. In Step 5, if the logic detects an imbalance in the number of outstanding I/O requests issued by each VM, then in Step 6 it overrides the normal operation of the availability manager to downgrade an operating state of one of the two virtual machines (VMs) host devices (VM.1 running on Host.1 in this case), and it defers the downgrade operation for some pre-selected period of time. During this deferral time period, the logic continues to monitor the number of I/O requests associated with the VMs running on Host.1 and Host.2 that are outstanding, and if in Step 7, the logic determines that the imbalance is resolved, then in Step 8 it cancels the downgrade operation (to the VM.1 running on Host.1 in this case), and both VMs continue to operate in the active and online mode. On the other hand, if in Step 7 during the deferral period the logic does not detect that the imbalance is resolved, and if in Step 9 the logic detects that an I/O request issued by the VM.1 on Host.1 times out, then in Step 10 the logic initiates an immediate downgrade operation by cancelling the override in Step 6. However, if during the deferral period in Step 9 the logic does not detect that an I/O request issued by the VM.1 running on Host.1 times out, and if in Step 11 it determines that the deferral period has expired, then in Step 10 the logic initiates an immediate downgrade operation by cancelling the override in Step 6, otherwise the logic loops back to Step 7 and continues to monitor the number of I/O requests outstanding to the two VMs running on Host.1 and Host.2. The logic continues in the Step 7-Step 11-Step 7 loop until the deferral period expires, which in the embodiment described herein is thirty seconds, but the deferral period can be greater or less than this period.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of controlling the operational state of a first or a second virtual machine in a fault tolerant computer system, comprising:

monitoring, by a first availability manager running on the first virtual machine associated with a first host computer, a current health of a plurality of an immediately detectable and delayed detection operational characteristics that are associated with the first virtual machine;

monitoring, by a second availability manager running on the second virtual machine associated with a second host computer, a current health of a plurality of an immediately detectable and delayed detection operational characteristics that are associated with the second virtual machine, wherein the fault tolerant computer system is comprised of the first and the second host computers;

examining, by the first and second availability managers, the health of at least one of the monitored immediately detectible operational characteristics on each of the corresponding first and the second virtual machines, and if it is determined after the examination of the immediately detectible operational characteristics of the corresponding first and second virtual machines that the health of each of the first and second virtual machines is indistinguishably poor; then examining, by the first and the second availability managers, the delayed detection operational characteristics associated with the corresponding first and second virtual machines and if the examination of the delayed detection operational characteristic associated with the first and the second virtual machines indicates that at least one of the plurality of the monitored delayed detection operational characteristics associated with the first virtual machine is in poor health which causes the first virtual machine to be in poor health relative to the health of the second virtual machine, then;

overriding, by the first availability manager, an operational state downgrade of the first virtual machine during a pre-specified deferral period of time while the health of the monitored delayed detection operational characteristic associated with the first virtual machine continues to be monitored.

2. The method of claim 1, further comprising cancelling the operational state downgrade if during the pre-specified deferral period it is determined that the monitored delayed detection operational characteristic associated with the first virtual machine returns to good health.

3. The method of claim 1, further comprising downgrading the operational state of the first virtual machine if during the pre-selected deferral period the delayed detection operational characteristic associated with the first virtual machine does not return to normal health.

4. The method of claim 1, wherein the operational state of the first and second virtual machines is one of an active and on-line state, an on-line state, or off-line state.

5. The method of claim 1, wherein the immediately detectable operational characteristic is any operational characteristic that can be used to qualify the operational state of either the first or the second virtual machine and that is detected by the first of the second availability managers prior to the expiration of a pre-specified period of time.

6. The method of claim 5, wherein the pre-specified period of time is a time value that is less than the time it takes to detect that communication is lost between either the first of the second virtual machines and functionality that they rely upon to provide fault tolerant services.

7. The method of claim 1, wherein the immediately detectable operational characteristic is any one of a loss of connectivity between the first and the second virtual machine, a loss of connectivity between either the first or the second virtual machine and another computational device, and the loss of connectivity between either the first and the second virtual machine and a network.

8. The method of claim 1, wherein the delayed detection operational characteristic is any operational characteristic that can be used to qualify the operational state of either the first or the second virtual machine and that is detected by the fault tolerant computer subsequent to the expiration of a pre-specified period of time.

9. The method of claim 8, wherein the pre-specified period of time is a time value that is greater than the time it takes to detect that communication is lost between the virtual machine and functionality that it relies upon to provide fault tolerant service.

10. The method of claim 1, wherein the delayed detectable operational characteristic is the loss of connectivity between the first or the second virtual machine and a virtual container.

* * * * *